United States Patent
Markmann et al.

(10) Patent No.: US 7,297,366 B1
(45) Date of Patent: Nov. 20, 2007

(54) LINOLEUM STRUCTURE AND METHOD FOR PRODUCING SAME

(75) Inventors: Ole Markmann, Delmenhorst (DE); Bernd Schulte, Delmenhorst (DE)

(73) Assignee: DLW Aktiengesellschaft, Inc., Bietigheim-Bissingen (DE)

( * ) Notice: Subject to any disclaimer, the term of this patent is extended or adjusted under 35 U.S.C. 154(b) by 0 days.

(21) Appl. No.: 09/701,501

(22) PCT Filed: Apr. 10, 2000

(86) PCT No.: PCT/EP00/03180

§ 371 (c)(1),
(2), (4) Date: Jan. 8, 2001

(87) PCT Pub. No.: WO00/61855

PCT Pub. Date: Oct. 19, 2000

(30) Foreign Application Priority Data

Apr. 8, 1999  (DE) ................................ 199 15 868

(51) Int. Cl.
*B05D 1/12* (2006.01)
*B05D 3/00* (2006.01)
*B05D 1/36* (2006.01)

(52) U.S. Cl. ...................... 427/180; 427/189; 427/194; 427/195; 427/201

(58) Field of Classification Search ................ 428/323, 428/340, 411.1, 904.4, 908.8; 427/180, 189, 427/194, 195, 201, 222
See application file for complete search history.

(56) References Cited

U.S. PATENT DOCUMENTS

| | | | |
|---|---|---|---|
| 592,186 A * | 10/1897 | Bedford ...................... | 156/238 |
| 2,894,560 A | 7/1959 | Nelson et al. ................ | 154/25 |
| 2,962,081 A * | 11/1960 | Dobry et al. ................ | 425/115 |
| 5,571,588 A * | 11/1996 | Lussi et al. ................... | 428/46 |

* cited by examiner

*Primary Examiner*—Sheeba Ahmed
(74) *Attorney, Agent, or Firm*—Womble Carlyle Sandridge & Rice, PLLC

(57) ABSTRACT

The present invention relates to a process for producing a novel patterned flexible linoleum sheet material.

6 Claims, 4 Drawing Sheets

LINOLEUM STRUCTURE AND METHOD FOR PRODUCING SAME

Figure 1:
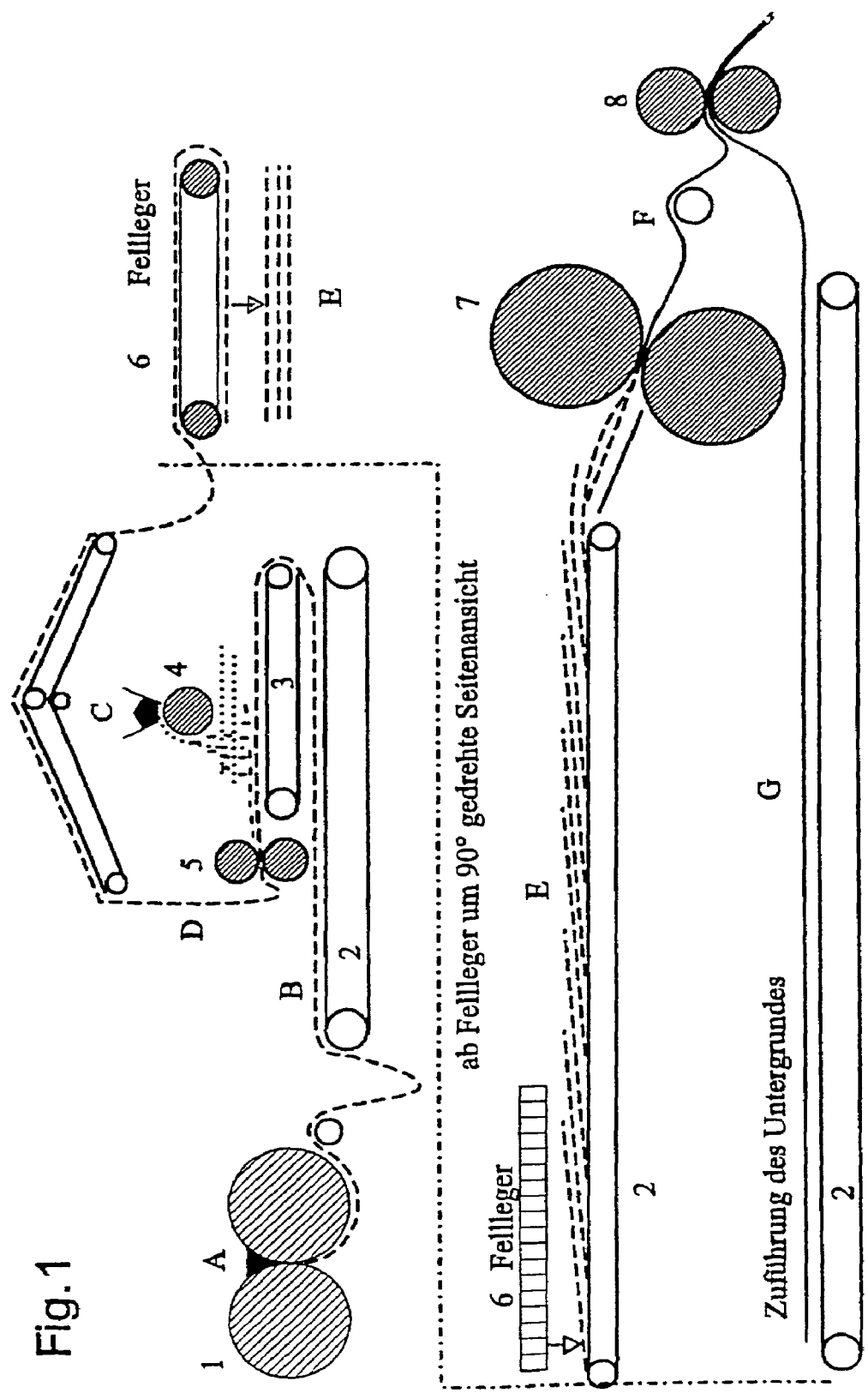

The present invention relates to a process for the production of a novel patterned flexible linoleum sheet material.

Linoleum has been produced for many decades, predominantly in unicolored, speckled and also marbled patterns. The flexible linoleum sheet materials are produced by first mixing all components, such as binders (so-called Bedford cement or B cement made of a partially oxidized linseed oil and at least one resin as an adhesion promoter), at least one filler and at least one coloring agent, in a suitable mixing apparatus, e.g., a kneader, roll mill or extruder, to form as homogenous a matrix as possible (mixed mass). The fillers used are typically soft wood flour and/or powdered cork (if both wood flour and powdered cork are present, the weight ratio is usually 90:10) and/or chalk, kaolin (china clay) and heavy spar. The mixed mass usually contains at least one coloring agent, such as a pigment (e.g., titanium dioxide) and/or other conventional coloring agents based on inorganic and organic dyes. A typical linoleum composition contains, in relation to the weight of the wear layer, about 40% by weight binder, about 30% by weight organic fillers, about 20% by weight inorganic (mineral) fillers, and about 10% by weight coloring agents. The mixed mass may further contain conventional additives, such as processing aids, antioxidants, UV stabilizers, slip agents and the like, which are selected as a function of the binder.

To produce a unicolored flexible linoleum sheet material, the mixed mass thus obtained is fed into a roll mill (e.g., a calender), and is pressed under pressure onto a substrate at a temperature of typically 10° C. to 150° C. (as a function of the formula and the process technology). A material based on natural and/or synthetic fabrics or knits as well as textile materials may be used as the substrate. Examples are jute fabrics, blends of natural fibers, such as cotton and viscose, glass fiber fabrics, glass fiber fabrics coated with adhesion promoters, blends of synthetic fibers, fabrics of core/sheath fibers with, for example, a core of polyester and a sheath of polyamide. As an adhesion promoter for glass fiber fabrics, a coating made of styrene butadiene latex may be used to coat the glass fibers.

When the mixed mass is pressed onto the substrate, the roll mill (e.g. the nip of a calender) is adjusted such that the resulting floor-covering strip has the desired layer thickness. For linoleum floor coverings, the total thickness is typically about 2 mm to about 6 mm, particularly about 2 mm to about 4 mm.

If a color-patterned floor covering is to be produced, differently colored mixed masses or matrices are first produced separately, rolled into sheets and granulated. The differently colored granulates are then mixed together and fed into a roll mill (e.g. a calender) to produce a speckled linoleum sheet. This sheet can then be pressed either directly onto the textile substrate or onto a textile substrate previously coated with aunicolored mixed mass and/or corkment.

The process for producing marbled structures (known under the trade name Marmorettee® or Marmoleum®) is also known per se and comprises the following steps:

The mixed masses produced from the standard linoleum raw materials, e.g. linoleum cement, wood flour, powdered cork, chalk, white pigment and colored pigments, are mixed in defined proportions as a function of the desired pattern and are fed into a roll mill in the form of a carded mixed mass. The multicolored speckled linoleum sheet thus obtained (about 1.6 m wide) is divided into pieces about 2 m long and arranged scale-like in the form of a multilayer sheet stack. The strongly longitudinally oriented speckling of the individual sheets extends perpendicularly to the calendering process direction in the further manufacturing process. The sheet stack is now fed into the nip of a calender and rolled with friction into the desired thickness of the top layer. Simultaneously with the top layer, the substrate is manufactured, which consists of a jute fabric and a calendered, usually unicolored, mixed linoleum mass. The substrate and top layer are placed on top of one another and are non-positively connected in the ribbon calender.

In contrast to the flexible sheet materials in which plastic is used as a binder in the wear layer, a linoleum-based flexible sheet material is not ready for use after calendering of the mixed mass or matrix. At this stage, linoleum does not have sufficient tensile and compressive strength for the continued production process and further use. This strength is developed only in a subsequent maturing process by further cross-linking of the binder. For this purpose the strip is transported from the calender to a maturing chamber where it is stored while hanging over rods. The linoleum strip matures, i.e., cross-links further to the desired degree in air heated to a temperature of about 40° C. to 100° C. for a period that depends on the formula, the thickness of the wear layer, the temperature and the desired degree of cross-linkage. This takes from about 5 to about 50 days. Thus, the substrate during production of flexible linoleum sheet material serves to carry and fix the wear layer until after maturing and subsequently, for example, as reinforcement of the floor covering.

Since the organic fillers, such as wood flour and/or powdered cork, contained in the flexible sheet material release moisture during the maturing process, the flexible sheet material is usually conditioned after maturing, i.e., it is adjusted to a normal degree of humidity found in a building.

The disadvantage of the process for producing a conventionally patterned flexible linoleum sheet material, in which differently colored carded mixed masses are poured directly into a calender nip and rolled into a speckled linoleum sheet, is that more or less pronounced longitudinally oriented structures necessarily result, which greatly limit the design possibilities for a patterned flexible linoleum sheet material.

Thus, the object of the present invention is to provide a process for producing a novel, flexible linoleum sheet material, which permits a greater range of variation in the patterning of the flexible linoleum sheet material to be produced. Furthermore, it should preferably be possible to use existing production equipment for fabrication.

The object of the present invention is attained by the embodiments characterized in the dependent claims.

Specifically, this object is attained by providing a process for producing a flexible linoleum sheet material comprising the steps of dispersing at least one type of unicolored or multicolored mixed mass particles over at least one side of a unicolored or multicolored rolled linoleum sheet and substantially warp-free pressing of the mixed mass particles into the rolled linoleum sheet.

The process for producing the novel structure is essentially based on the process for producing a marbled or speckled flexible linoleum sheet material, but has been supplemented by incorporating additional process steps in the production process.

This dispersion of differently colored particles on a rolled linoleum sheet has not thus far been used in the production of flexible linoleum sheet materials, since no suitable dispersion techniques have been available for the mixed linoleum mass. An exemplary dispersion process applicable in accordance with the present invention will be described below, particularly in connection with FIG. 3.

The mixed mass particles to be dispersed are present in the form of a granular dispersion mass. They can be unicolored or multicolored and, according to the invention, at least one type of such mixed mass particles is dispersed over the linoleum sheet. The composition of the particles can be identical to or different from the composition of the rolled linoleum sheet. Preferably, the particles have a similar composition to that of the rolled linoleum sheet, except for their pigmentation. Particularly preferably, the particles are dryer than the linoleum sheet, i.e., contain less linoleum cement to improve their dispersibility. Preferably, the mixed mass particles are dyed at least one color, which contrasts with the color of the rolled linoleum sheet. All of the particles can have substantially the same size, but particles of different sizes may also be dispersed on the linoleum sheet. Furthermore, the particles may differ in shape and may be present, for example, as irregular grains, spheres or ovals. The particles preferably have a diameter of 0.5 mm to 20 mm, particularly preferably 0.5 mm to 10 mm. According to one exemplary embodiment, these particles have a greater diameter than those of the linoleum sheet onto which they are dispersed. One, two or several types of these mixed particles may be dispersed. The particles may be produced using the same process as that for producing the normal mixed mass. Separate screening may possibly be required.

According to the invention, the particles are dispersed on a unicolored or multicolored, for example marbled or speckled, linoleum sheet. The rolled linoleum sheet is preferably 0.5 mm to 2.5 mm thick, more preferably 1 mm to 2 mm, and particularly preferably from 1 mm to 1.5 mm.

It is sufficient to disperse the particles only onto the reverse side or only onto the front side of the linoleum sheet. To obtain a more uniform, continuous patterning, it may be preferred to disperse the particles on both sides of the linoleum sheet. It is further preferred to isolate the particles during the dispersion process by arranging a screen-like device in order to obtain as uniform and homogenous a distribution of the particles on the linoleum sheet as possible. Generally, the particles will strike and be pressed into the linoleum sheet in a random pattern, as is usually the case in a dispersion process. However, the particles may also be distributed in a deliberately defined pattern, for example in the form of geometric or non-geometric figures. The mixed mass particles are preferably dispersed in a quantity of 10 g/m$^2$ to 500 g/m$^2$ in relation to the weight of the linoleum sheet. The pressed-in particles are preferably densely arranged in the rolled linoleum sheet.

After dispersion on the linoleum sheet, the particles are pressed substantially warp-free into the linoleum sheet, for example by means of a mangle or some other pressing tool. The mixed mass particles of the dispersion mass are preferably pressed deep enough into the soft linoleum sheet to be as flush as possible with the linoleum sheet. It is also possible, however, to press the particles only partially into the linoleum sheet to obtain a linoleum sheet with an uneven surface structure.

According to one embodiment of the inventive process, the rolled linoleum sheet equipped with dispersed and pressed-in linoleum particles may be directly connected to the substrate as a pattern-providing sheet (top layer).

According to a particularly preferred embodiment of the inventive process, however, the rolled linoleum sheet is cut into lengths of about 2 m after the particles have been dispersed and pressed in. With the help of a sheet placer, the pieces are then arranged scale-like to form a sheet stack, so that any location of the sheet stack is preferably at least 10, particularly preferably 10 to 20 sheets high, and the scales are preferably offset by 100 mm to 200 mm. Depending on the thickness of the individual sheets, the sheet stack is thus 12 mm to 35 mm thick. The pieces are preferably positioned in such a way that the original longitudinal direction of the rolled linoleum sheet lies perpendicular (90°) to the transport direction of the scale-like sheet stack. The sheet can then be rolled out with friction to the desired thickness, e.g. by means of a sheet calender, to form a pattern-providing sheet (top layer) causing it to expand by 10 to 20 times its length. The sheet calender used has an upper cold roll with a rough surface and a lower heated roll with a smooth surface. The rough surface of the upper cold roll causes tongue-shaped pieces to be torn out of the surface of the sheet stack so that the sheet stack tears, particularly at the boundaries between the matrix and the differently colored dispersed and pressed-in particles. Since the sheet stack is heated from below by the heated lower roll of the sheet calender and thus has a somewhat softer consistency in its lower half than on the upper side of the sheet stack, which is in contact with the cold roll, the gaps or interstices produced by tearing are filled in by the matrix-colored material found between the dispersed particles. This increases the distance between the previously preferably densely arranged dispersion particles. One would assume that the dispersed particles would be stretched in longitudinal direction during calendering and rolling of the sheet, so that a longitudinally oriented striped pattern would be obtained. Surprisingly, however, the form of the dispersed particles is substantially preserved in this embodiment as well, and the linoleum speckles in the finished top sheet are nondirectional or only slightly oriented. It is assumed that due to the tearing of the linoleum sheet along the interfaces between the matrix and the dispersed particles, the shear forces act less strongly on the particles, so that the particles are not deformed and the nondirectional form of the dispersed particles is thus preserved. These "weak links" between matrix and particles can be explained by the fact that the bond between the pressed-in particles and the matrix is less strong prior to the final calendering process than the coherence of the matrix itself. This can be the case particularly if the dispersed particles, as described above, are preferably somewhat drier.

After calendering, the sheet stack is preferably only 1 mm to 2 mm thick and contains the dispersed particles throughout the thickness of the flexible sheet material, so that even if the topmost layer of the embedded particles is locally abraded through wear, slightly deeper lying particles become visible at the surface. Thus, the flexible sheet material produced by the process according to the invention retains its speckled pattern even after considerable wear.

The above-described calendered sheet stack as the top layer may be connected with the substrate, for example by means of a doubling mangle.

The substrate as a rule consists of a substrate fabric, for example, a jute, glass fiber, or synthetic fabric, onto which is calendered a thin layer, for example, of a unicolored linoleum mixed mass.

The non-positive connection of substrate and top layer is produced, for example, by means of a ribbon calender or by similar devices. The subsequent maturing and further processing of the flexible sheet material thus produced by means of the inventive process is carried out in the same manner as for conventional flexible linoleum sheet materials.

Surprisingly, the process according to the invention makes it possible to obtain a flexible linoleum sheet material having a structure that is variable on the one hand through the structure of the linoleum sheet and on the other hand through the dispersed unicolored or multicolored particles of at least one type, which penetrate the top layer and provide a nearly nondirectional surface appearance.

The process according to the invention permits the production of an indeterminate number of novel linoleum structures. All of these structures have in common the dispersion of unicolored or multicolored mixed mass particles, e.g. in an irregular arrangement, to produce nondirectional or only slightly oriented linoleum specks. Variations are possible by selecting form and size as well as quantity and color of the dispersed particles and by varying the structure of the rolled linoleum sheet (marbled, unicolored, speckled, etc.).

The present invention thus also comprises the flexible linoleum sheet material having a top layer as a matrix with at least a first color, and at least one type of particle embedded in the matrix in a contrasting color. The top layer can be unicolored, marbled, or speckled and can contain one or several types of unicolored and/or multicolored particles, which can differ in size and/or color.

The particles may be embedded only in the topside of the top layer, penetrate the entire top layer as individual particles or, as described above, may be distributed over the entire thickness of the top layer. The particles are preferably present in an irregular arrangement, but may also be distributed in a arbitrarily defined pattern, e.g. in the form of geometric and non-geometric figures.

In relation to the total weight of the top layer, the particles are preferably present in an amount of 10 g/m$^2$ to 500 g/m$^2$.

In the figures:

FIG. 1 shows a schematic view of an apparatus to implement a preferred embodiment of the process according to the invention. From the prefabricated unicolored or multicolored mixed linoleum mass A, a sheet is rolled in the sheet rolling mill (1). Depending on the mixed mass A, a unicolored or speckled linoleum sheet B is obtained. Via a first conveyor belt (2), the linoleum sheet B is transported to a second conveyor belt (3), where a dispersion unit (4) individually disperses the mixed mass particles of at least one type of a unicolored or multicolored dispersion mass C over linoleum sheet B. After dispersion over linoleum sheet B, the mixed mass particles of the dispersion mass C are pressed deep into the soft linoleum sheet B by means of a mangle (5), so that they are as flush as possible with linoleum sheet B. The linoleum sheet D thus prepared is now fed to the sheet placer (6), separated into about 2 m long sections and arranged in a scale-like sheet stack E. The sheet stack E is placed onto a further conveyor belt such that the sprinkled side of sheet stack E points toward the top. This conveyor belt feeds sheet stack E to the sheet calender (7) with the sprinkled linoleum sheet side facing toward the cold patterning roll. In the sheet calender (7), the sheet stack E is rolled to the desired thickness to form a flexible sheet F (top layer) and is connected to the substrate G in a doubling mill (8).

Figure 2:
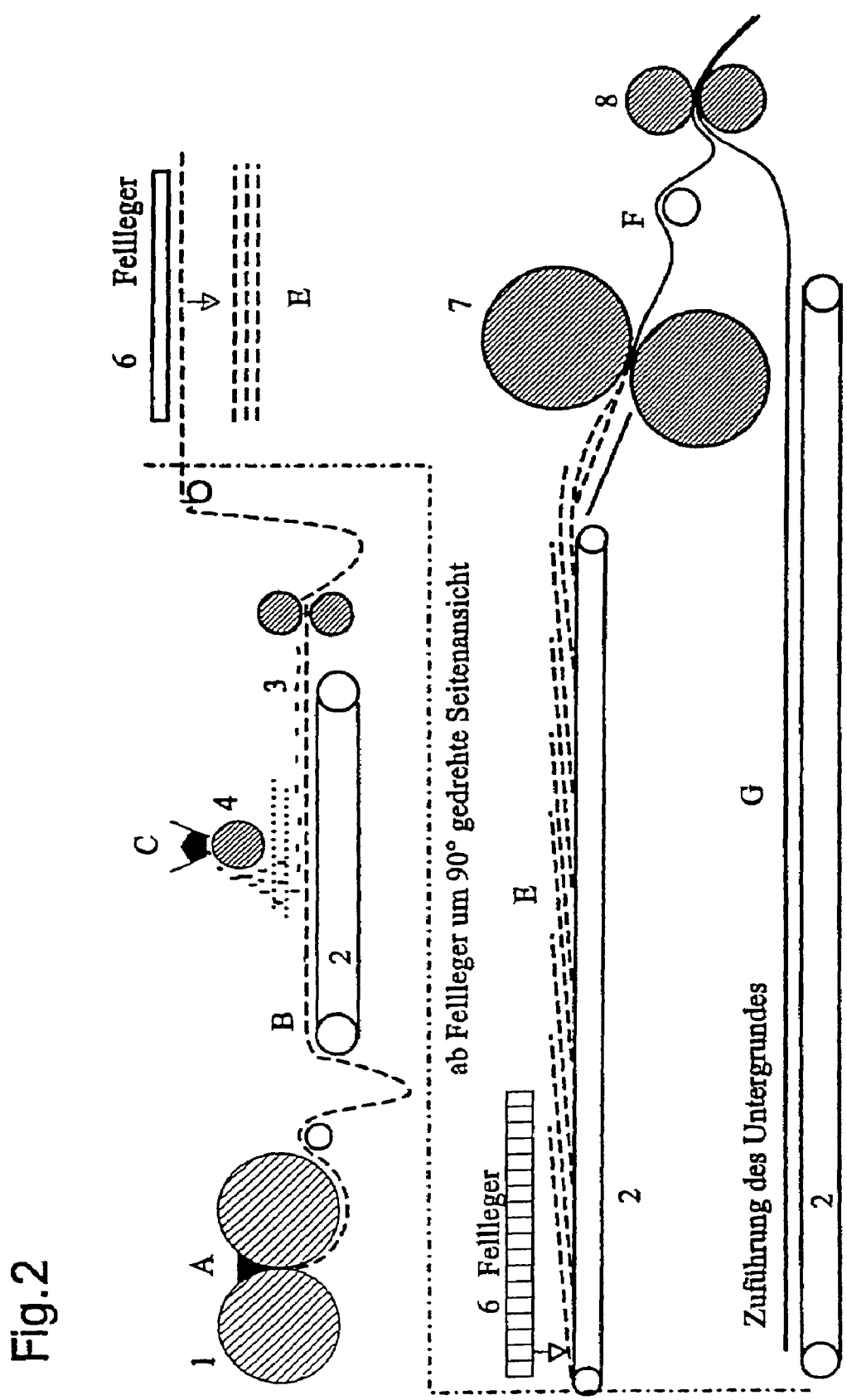

FIG. 2 is a schematic view of an apparatus for implementing a further preferred embodiment of the process according to the invention. While in the embodiment shown in FIG. 1 particles C are dispersed onto the reverse side of the linoleum sheet B, in unit (2) the dispersion mass C is dispersed directly onto the front of the linoleum sheet B.

Figure 3:
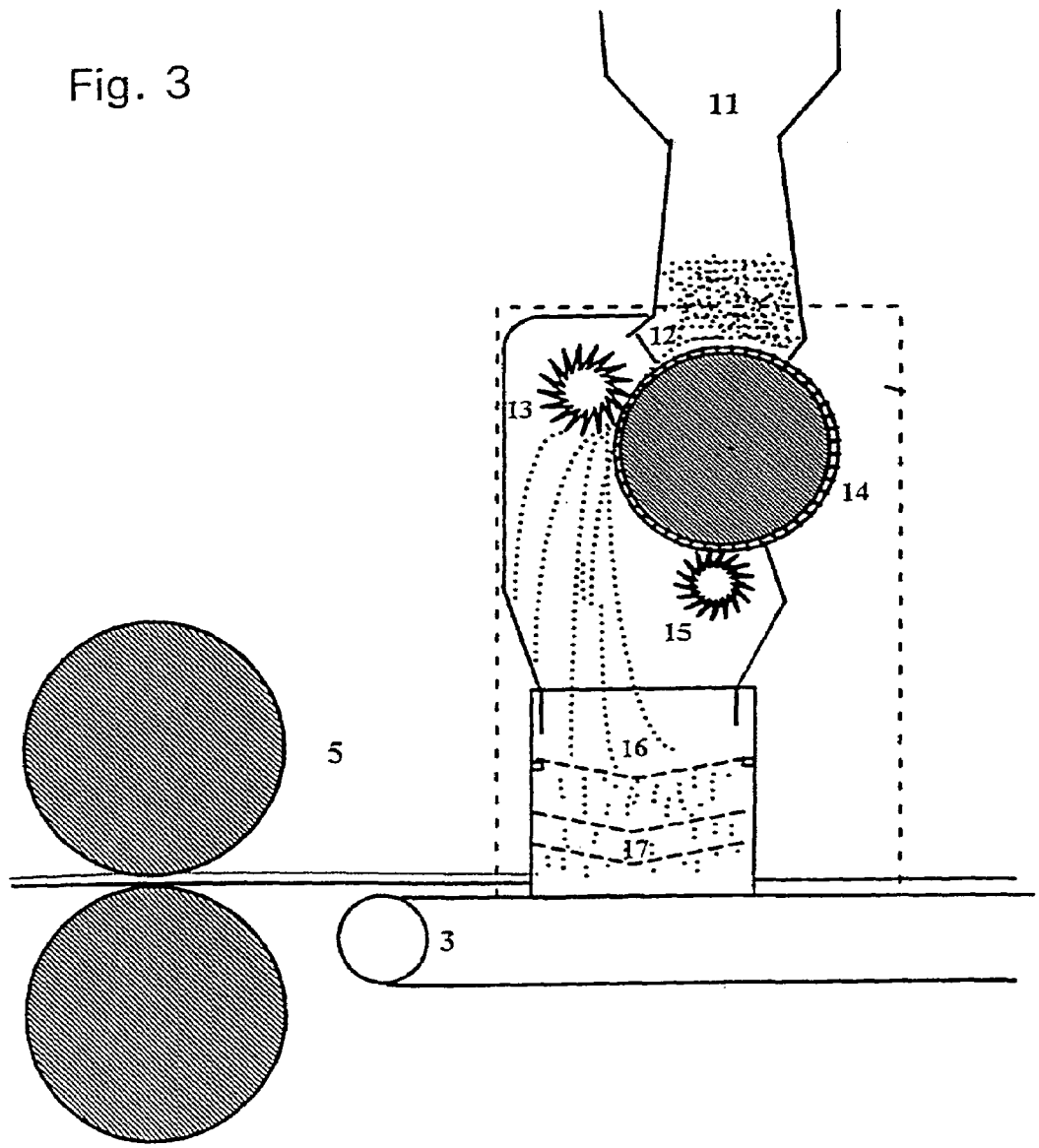

FIG. 3 is a schematic view of a dispersion unit (4) for a linoleum mass that may be used in the process according to the invention. The mixed linoleum mass is poured into a funnel (11), which preferably opens somewhat conically toward the bottom to prevent arching of the mixed mass. A profiled roll (14) picks up the mixed mass in its indentations. As the roll rotates, the mixed mass is then stripped by a doctor blade (12) at the height of the raised roll profile, so that, depending on the rational speed, a precisely defined amount of the mixed mass is transported within the indentations of the profiled roll (14) to the downstream ejection brush roll (13). The counter rotating ejection brush roll (13) rotates at a substantially higher speed than the profiled roll (14) and with the brush (13) reaching deeply into the indentations of the profiled roll (14) ejects the mixed mass in downward direction. An additional cleaning brush (15) may be used to eject any mixed mass residues that may have remained in the indentations of the profile roll (14). The downwardly ejected mixed max falls onto a traversely moving screen (16), which helps to equalize the dispersion and to make it more uniform. Below the traversely moving screen (one or more stationary screens (17) may be arranged to slow down the mixed particles brought into an oblique falling motion and to cause them to strike the linoleum sheet passing closely beneath with as little energy as possible. A conveyor belt (3) transports the sprinkled linoleum sheet to a mangle (5) used to press the relatively stable linoleum particles into the soft linoleum sheet.

Figures 4A, 4B:
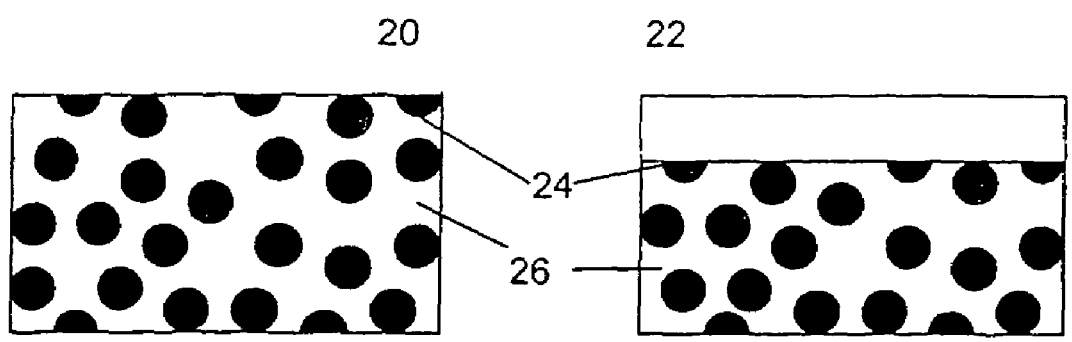

FIGS. 4a and 4b show schematic cross sections through layers 20 and 22 at different stages of wear of the flexible sheet material produced according to a particularly preferred embodiment of the invention. The colored, dot-shaped particles 24 are distributed in matrix 26 over the entire thickness of the top layer. FIG. 4b shows the top layer from FIG. 4a in a condition after prolonged wear. A topmost layer of the flexible sheet material has been abraded by wear, so that both matrix 26 and particles 24 in this layer have been worn away. At the same time, however, particles from deeper layers have become visible so that the pattern of the floor covering presents the same appearance to the user.

The invention claimed is:

1. A process for producing a patterned flexible linoleum sheet material comprising the steps of:
   dispersing at least one type of linoleum particles onto at least one side of a rolled linoleum sheet; and
   pressing the linoleum particles into the rolled linoleum sheet such that the linoleum particles are not substantially distorted;
   cutting the rolled linoleum sheet;
   rotating the rolled linoleum sheet 90°;
   stacking the rolled linoleum sheet into a sheet stack; and
   rolling the sheet stack into a pattern providing sheet;
   wherein the linoleum particles comprise a smaller proportion of linoleum cement than the rolled linoleum sheet;
   wherein the linoleum particles are present in the form of a granular dispersion; and
   wherein the linoleum particles are unicolored particles, multicolored particles, or combinations thereof.

2. The process of claim 1, wherein the rolled linoleum sheet having dispersed and pressed-in linoleum particles is processed directly as a pattern-providing sheet into a flexible linoleum material.

3. The process of claim 1, wherein the linoleum particles are pressed into the linoleum sheet by means of a pressing tool.

4. The process of claim 1, wherein the rolled linoleum sheet is unicolored, marbled or speckled.

5. The process of claim 1, wherein the linoleum particles are dispersed onto both sides of the rolled linoleum sheet.

6. The process of claim 1, wherein the rolled linoleum sheet is unicolored or multicolored.

* * * * *